United States Patent [19]
Muto

[11] Patent Number: 5,799,129
[45] Date of Patent: *Aug. 25, 1998

[54] METHOD AND APPARATUS FOR REPRODUCING CODED DATA IN WHICH THE CODED DATA IS DECODED IN REVERSE ORDER OF DISPLAY

[75] Inventor: Akihiro Muto, Tokyo, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 600,687

[22] Filed: Feb. 13, 1996

[30] Foreign Application Priority Data

Feb. 15, 1995 [JP] Japan ................................. 7-049279

[51] Int. Cl.$^6$ ................................................ H04N 5/783
[52] U.S. Cl. ........................................... 386/111; 386/68
[58] Field of Search ........................... 386/46, 111, 109, 386/112, 125, 68, 124; 348/565; H04N 5/76, 5/92, 5/783

[56] References Cited

U.S. PATENT DOCUMENTS

| | | | |
|---|---|---|---|
| 4,725,888 | 2/1988 | Hakamada | 348/565 |
| 4,931,879 | 6/1990 | Koga et al. | 386/111 |
| 5,305,113 | 4/1994 | Iwamura et al. | 386/111 |
| 5,371,602 | 12/1994 | Tsuboi et al. | 386/111 |
| 5,504,585 | 4/1996 | Fujinami et al. | 386/111 |
| 5,535,008 | 7/1996 | Yamagishi et al. | 386/109 |

FOREIGN PATENT DOCUMENTS 0 545 323 A1  6/1993  European Pat. Off. .

OTHER PUBLICATIONS

F. Pereira et al.: "A CCITT Compatible Coding Algorithm for Digital Recording of Moving Images." Signal Processing. Image Communication., vol. 2, No. 2, Aug. 1990, Amsterdam NL, pp. 155–169.

*Primary Examiner*—Thai Tran
*Assistant Examiner*—Huy Nguyen
*Attorney, Agent, or Firm*—Frommer Lawrence & Haug LLP; William S. Frommer

[57] ABSTRACT

A coded-data special reproduction method which reads out and decodes unit group data composed of intra-frame coded data, inter-frame forward predictive coded data and bidirectionally predictive coded data, then writes the decoded data into a frame buffer means and, after reading out the data therefrom, displays such data. The method comprises the steps of continuously decoding portions of the intra-frame coded data and the inter-frame forward predictive coded data constituting the unit group data read out, while intermittently decoding the remaining coded data; writing the decoded data in the frame buffer means; reading out the data therefrom in a reverse order of the original pictures; and displaying the pictures thus read out. An apparatus contrived to carry out the above method comprises a buffer for storing the group data; a decoder for decoding the coded data obtained from the buffer; and a frame buffer for storing the respective coded data decoded by the decoder. Special reverse reproduction of the coded data can be achieved to realize natural reproduced pictures on a display device without the necessity of raising the coded-data transfer rate to the decoder or increasing the storage capacity of the frame buffer.

13 Claims, 35 Drawing Sheets

IGD = 15 PICTURES (n = 1, m = 15)

ORDER ON ACTUAL BIT STREAM

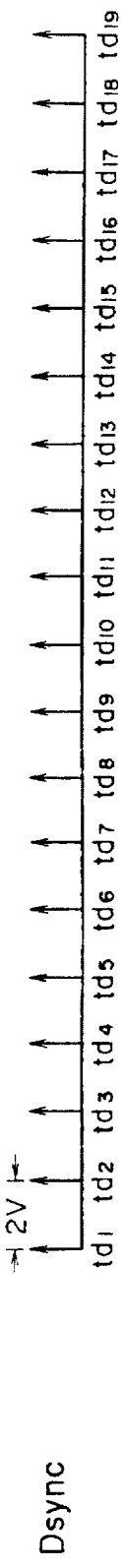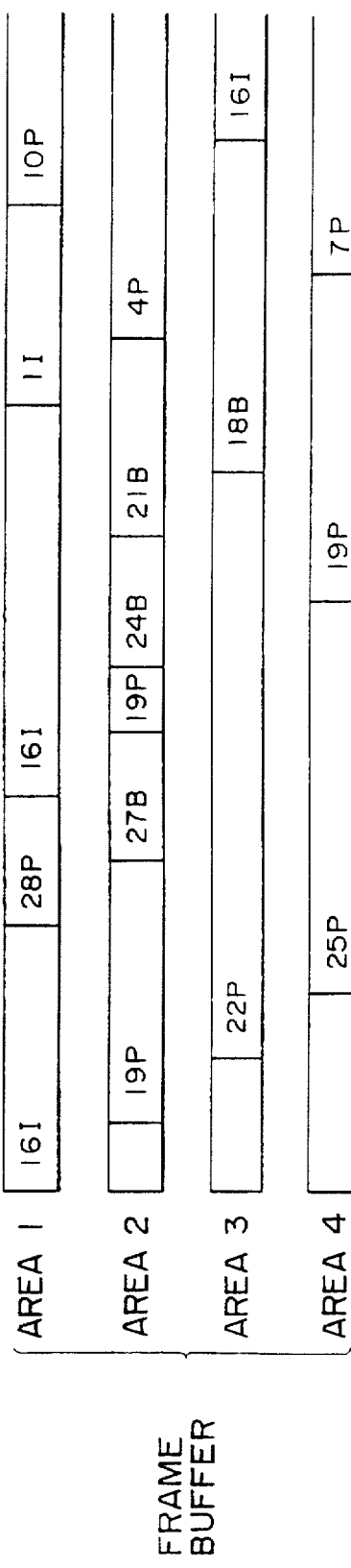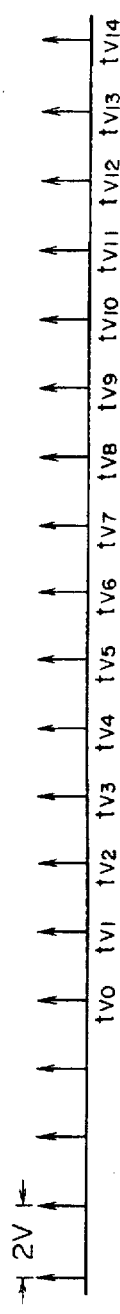

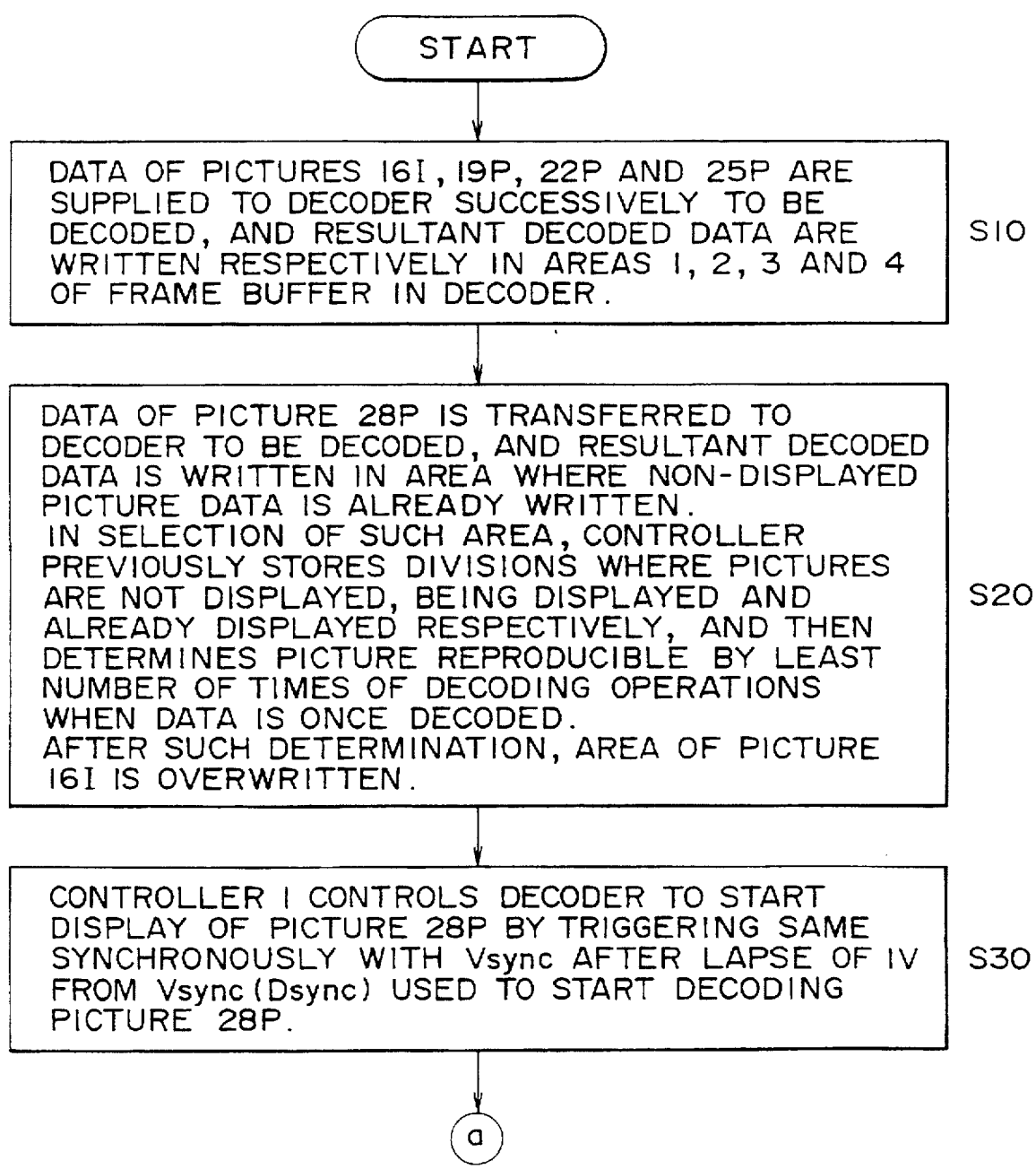

FIG. 5

STORAGE CAPACITY OF FRAME BUFFER : 4 FRAMES

DATA SUPPLY PATTERN :
28P, 27B, 16I, 19P, 24B, 19P, 21B, 18B, 1I, 4P, 7P, 10P, 16I, 13P, –, ···

REPRODUCTION PATTERN :
28P, 27B, 27B, 25P, 24B, 24B, 22P, 21B, 21B, 19P, 18B, 18B, 16I, 16I, 16I, ···

| CODE BUFFER READ | FRAME BUFFER | | | | DISPLAY |
|---|---|---|---|---|---|
| Dsync | 1 | 2 | 3 | 4 | Vsync |
| 16I   |      |     |     |     |     |
| 19P   | 16I  |     |     |     |     |
| 22P   | 16I  | 19P |     |     |     |
| 25P   | 16I  | 19P | 22P |     |     |
| 28P   | 16I  | 19P | 22P | 25P |     |
| 27B   | 28P  | 19P | 22P | 25P | 28P |
| 16I   | 28P  | 27B | 22P | 25P | 27B |
| 19P   | 16I  | 27B | 22P | 25P | 27B |
| 24B   | 16I  | 19P | 22P | 25P | 25P |
| 19P   | 16I  | 24B | 22P | 25P | 24B |
| 21B   | 16I  | 24B | 22P | 19P | 24B |
| 18B   | 16I  | 21B | 22P | 19P | 22P |
| 1I    | 16I  | 21B | 18B | 19P | 21B |
| 4P    | 1I   | 21B | 18B | 19P | 21B |
| 7P    | 1I   | 4P  | 18B | 19P | 19P |
| 10P   | 1I   | 4P  | 18B | 7P  | 18B |
| 16I   | 10P  | 4P  | 18B | 7P  | 18B |
| 13P   | 10P  | 4P  | 16I | 7P  | 16I |
| —     | 10P  | 4P  | 16I | 13P | 16I |
| 7P    | 10P  | 4P  | 16I | 13P | 16I |
| —     | 10P  | 4P  | 7P  | 13P | 13P |
| ....  |      |     |     |     |     |

FIG. 6

STORAGE CAPACITY OF FRAME BUFFER : 3 FRAMES
DATA SUPPLY PATTERN :
  22P, — , — , — , -14I, -11P, -8P, — , ···
REPRODUCTION PATTERN :
  22P, 22P, 19P, 19P, 16I, 16I, -8P, -8P, ···

| CODE BUFFER READ Dsync | FRAME BUFFER 1 | 2 | 3 | DISPLAY Vsync |
|---|---|---|---|---|
| 16I | | | | |
| 19P | 16I | | | |
| 22P | 16I | 19P | | |
| — | 16I | 19P | 22P | |
| — | 16I | 19P | 22P | 22P |
| — | 16I | 19P | 22P | 22P |
| — | 16I | 19P | 22P | 19P |
| -14I | 16I | 19P | 22P | 19P |
| -11P | 16I | 19P | -14I | 16I |
| -8P | 16I | -11P | -14I | 16I |
| — | -8P | -11P | -14I | -8P |
| . . . . | | | | |

FIG. 7

STORAGE CAPACITY OF FRAME BUFFER : 3 FRAMES
DATA SUPPLY PATTERN :
  22P, − , 11I, 4P, − , 7P, − , -14I, -11P, ⋯
REPRODUCTION PATTERN :
  22P, 22P, 19P, 16I, 16I, 7P, 7P, 4P, 11I, ⋯

| CODE BUFFER READ | FRAME BUFFER | | | DISPLAY |
| --- | --- | --- | --- | --- |
| Dsync | 1 | 2 | 3 | Vsync |
| 16I | | | | |
| 19P | 16I | | | |
| 22P | 16I | 19P | | |
|  | 16I | 19P | 22P | |
|  | | | | 22P |
| 11I | 16I | 19P | 22P | |
|  | | | | 22P |
| 4P | 16I | 19P | 11I | |
|  | | | | 19P |
| — | 16I | 4P | 11I | |
|  | | | | 16I |
| 7P | 16I | 4P | 11I | |
|  | | | | 16I |
| — | 7P | 4P | 11I | |
|  | | | | 7P |
| -14I | 7P | 4P | 11I | |
|  | | | | 7P |
| -11P | -14I | 4P | 11I | |
|  | | | | 4P |
| ⋯ | | | | |

FIG. 8

STORAGE CAPACITY OF FRAME BUFFER : 3 FRAMES
DATA SUPPLY PATTERN :
  19P, — , 18B, — , 1I, 4P, — , 3B, ⋯
REPRODUCTION PATTERN :
  19P, 19P, 18B, 16I, 16I, 4P, 4P, 3B, ⋯

| CODE BUFFER READ Dsync | FRAME BUFFER | | | DISPLAY Vsync |
|---|---|---|---|---|
| | 1 | 2 | 3 | |
| 16I 19P | 16I | | | |
| — | 16I | 19P | | 19P |
| 18B | 16I | 19P | | 19P |
| — | 16I | 19P | 18B | 18B |
| 1I | 16I | 19P | 18B | 16I |
| 4P | 16I | 19P | 1I | 16I |
| — | 16I | 4P | 1I | 4P |
| 3B | 16I | 4P | 1I | 4P |
| — | 3B | 4P | 1I | 3B |
| ⋯ | | | | |

FIG. 9

STORAGE CAPACITY OF FRAME BUFFER : 3 FRAMES
DATA SUPPLY PATTERN :
  25P, — , 1I, 4P, 7P, 10P, 11, -14I, ···
REPRODUCTION PATTERN :
  25P, 25P, 22P, 16I, 16I, 10P, 10P, 7P, ···

| CODE BUFFER READ Dsync | FRAME BUFFER | | | DISPLAY Vsync |
|---|---|---|---|---|
| | 1 | 2 | 3 | |
| 16I | | | | |
| 19P | 16I | | | |
| 22P | 16I | 19P | | |
| 25P | 16I | 19P | 22P | |
| — | 16I | 25P | 22P | 25P |
| 1I | 16I | 25P | 22P | 25P |
| 4P | 16I | 1I | 22P | 22P |
| 7P | 16I | 1I | 4P | 16I |
| 10P | 16I | 4P | 7P | 16I |
| 1I | 16I | 10P | 7P | 10P |
| -14I | 1I | 10P | 7P | 10P |
| -11P | 1I | -14I | 7P | 7P |
| ···· | | | | |

FIG. 10

STORAGE CAPACITY OF FRAME BUFFER : 3 FRAMES
DATA SUPPLY PATTERN :
28P, – , – , 16I, – , – , 19P, – , – , 1I, – , – , 4P, 7P, 10P, 13P, ⋯
REPRODUCTION PATTERN :
28P, 28P, 28P, 25P, 25P, 25P, 22P, 22P, 22P, 19P, 19P, 19P, 16I, 16I, 16I, 13P, ⋯

| CODE BUFFER READ Dsync | FRAME BUFFER 1 | 2 | 3 | DISPLAY Vsync |
|---|---|---|---|---|
| 16I | | | | |
| 19P | 16I | | | |
| 22P | 16I | 19P | | |
| 25P | 16I | 19P | 22P | |
| 28P | 25P | 19P | 22P | |
| — | 25P | 28P | 22P | |
| | | | | 28P |
| — | 25P | 28P | 22P | |
| | | | | 28P |
| 16I | 25P | 28P | 22P | |
| | | | | 28P |
| — | 25P | 16I | 22P | |
| | | | | 25P |
| — | 25P | 16I | 22P | |
| | | | | 25P |
| 19P | 25P | 16I | 22P | |
| | | | | 25P |
| — | 19P | 16I | 22P | |
| | | | | 22P |
| — | 19P | 16I | 22P | |
| | | | | 22P |
| 1I | 19P | 16I | 22P | |
| | | | | 22P |
| — | 19P | 16I | 1I | |
| | | | | 19P |
| — | 19P | 16I | 1I | |
| | | | | 19P |
| 4P | 19P | 16I | 1I | |
| | | | | 19P |
| 7P | 4P | 16I | 1I | |
| | | | | 16I |
| 10P | 4P | 16I | 7P | |
| | | | | 16I |
| 13P | 10P | 16I | 7P | |
| | | | | 16I |
| — | 10P | 13P | 7P | |
| | | | | 13P |
| — | 10P | 13P | 7P | |
| | | | | 13P |

FIG. 11

STORAGE CAPACITY OF FRAME BUFFER : 4 FRAMES
DATA SUPPLY PATTERN :
  28P, 19P, 11, - , 4P, 7P, 10P, 13P, 4P, ···
REPRODUCTION PATTERN :
  28P, 25P, 22P, 22P, 19P, 16I, 16I, 13P, 10P, 7P, 7P, 4P, 1I, 1I, ···

| CODE BUFFER READ Dsync | FRAME BUFFER 1 | 2 | 3 | 4 | DISPLAY Vsync |
|---|---|---|---|---|---|
| 16I | | | | | |
| 19P | 16I | | | | |
| 22P | 16I | 19P | | | |
| 25P | 16I | 19P | 22P | | |
| 28P | 16I | 19P | 22P | | |
| 19P | 16I | 28P | 22P | 25P | 28P |
| 1I | 16I | 19P | 22P | 25P | 25P |
| — | 16I | 19P | 22P | 1I | 22P |
| 4P | 16I | 19P | 22P | 1I | 22P |
| 7P | 16I | 19P | 4P | 1I | 19P |
| 10P | 16I | 7P | 4P | 1I | 16I |
| 13P | 16I | 7P | 10P | 1I | 16I |
| 4P | 13P | 7P | 10P | 1I | 13P |
| ···· | | | | | |

FIG. 12

STORAGE CAPACITY OF FRAME BUFFER : 3 FRAMES
DATA SUPPLY PATTERN :
   28P, − , 16I, 1I, 4P, 7P, 10P, 13P, − , 1I, ⋯
REPRODUCTION PATTERN :
   28P, 28P, 22P, 22P, 16I, 16I, 16I, 13P, 13P, 7P, 7P, 1I, 1I, 1I, ⋯

| CODE BUFFER READ Dsync | FRAME BUFFER | | | DISPLAY Vsync |
|---|---|---|---|---|
| | 1 | 2 | 3 | |
| 16I | | | | |
| 19P | 16I | | | |
| 22P | 16I | 19P | | |
| 25P | 16I | 19P | 22P | |
| 28P | 25P | 19P | 22P | |
| — | 25P | 28P | 22P | 28P |
| — | 25P | 28P | 22P | 28P |
| 16I | 25P | 28P | 22P | 28P |
| 1I | 25P | 16I | 22P | 22P |
| 4P | 1I | 16I | 22P | 22P |
| 7P | 25P | 16I | 4P | 16I |
| 10P | 7P | 16I | 4P | 16I |
| 13P | 7P | 16I | 10P | 16I |
| — | 7P | 13P | 10P | 13P |
| ⋯ | | | | |

FIG. 13

STORAGE CAPACITY OF FRAME BUFFER : 3 FRAMES
DATA SUPPLY PATTERN :
  22P, – , – , – , – , 1I, 4P, 7P, – , – , – , – , ···
REPRODUCTION PATTERN :
  22P, 22P, 19P, 19P, 16I, 16I, 16I, 7P, 7P, 4P, 4P, 1I, 1I, 1I, ···

| CODE BUFFER READ Dsync | FRAME BUFFER | | | DISPLAY Vsync |
|---|---|---|---|---|
| | 1 | 2 | 3 | |
| 16I | | | | |
| 19P | 16I | | | |
| 22P | 16I | 19P | | |
| — | 16I | 19P | 22P | |
| — | 16I | 19P | 22P | 22P |
| — | 16I | 19P | 22P | 22P |
| — | 16I | 19P | 22P | 19P |
| — | 16I | 19P | 22P | 19P |
| 1I | 16I | 19P | 22P | 16I |
| 4P | 16I | 19P | 1I | 16I |
| 7P | 16I | 4P | 1I | 16I |
| — | 7P | 4P | 1I | 7P |
| ···· | | | | |

FIG. 14

STORAGE CAPACITY OF FRAME BUFFER : 5 FRAMES
DATA SUPPLY PATTERN :
28P, 1I, 4P, 7P, 10P, 13P, -14I, -11P, ⋯
REPRODUCTION PATTERN :
28P, 25P, 22P, 19P, 16I, 13P, 10P, 7P, ⋯

| CODE BUFFER READ Dsync | FRAME BUFFER | | | | | DISPLAY Vsync |
|---|---|---|---|---|---|---|
| | 1 | 2 | 3 | 4 | 5 | |
| 16I | | | | | | |
| 19P | 16I | | | | | |
| 22P | 16I | 19P | | | | |
| 25P | 16I | 19P | 22P | | | |
| 28P | 16I | 19P | 22P | 25P | | |
| 1I | 16I | 19P | 22P | 25P | 28P | 28P |
| 4P | 16I | 19P | 22P | 25P | 1I | 25P |
| 7P | 16I | 19P | 22P | 4P | 1I | 22P |
| 10P | 16I | 19P | 7P | 4P | 1I | 19P |
| 13P | 16I | 10P | 7P | 4P | 1I | 16I |
| -14I | 13P | 10P | 7P | 4P | 1I | 13P |
| -11P | -14I | 10P | 7P | 4P | 1I | 10P |
| 23B | -14I | -11P | 7P | 4P | 1I | 7P |
| ⋯ | | | | | | |

FIG. 15

STORAGE CAPACITY OF FRAME BUFFER : 4 FRAMES
DATA SUPPLY PATTERN :
  25P, — , 11, 4P, 7P, 10P, — , -14I, ⋯
REPRODUCTION PATTERN :
  25P, 25P, 22P, 19P, 16I, 10P, 10P, 7P, ⋯

| CODE BUFFER READ Dsync | FRAME BUFFER | | | | DISPLAY Vsync |
|---|---|---|---|---|---|
| | 1 | 2 | 3 | 4 | |
| 16I | | | | | |
| 19P | 16I | | | | |
| 22P | 16I | 19P | | | |
| 25P | 16I | 19P | 22P | | |
| — | 16I | 19P | 22P | 25P | |
| | | | | | 25P |
| 1I | 16I | 19P | 22P | 25P | |
| | | | | | 25P |
| 4P | 16I | 19P | 22P | 1I | |
| | | | | | 22P |
| 7P | 16I | 19P | 22P | 1I | |
| | | | | | 19P |
| 10P | 16I | 7P | 4P | 1I | |
| | | | | | 16I |
| — | 10P | 7P | 4P | 1I | |
| | | | | | 10P |
| -14I | 10P | 7P | 4P | 1I | |
| | | | | | 10P |
| ⋯ | | | | | 7P |
| ⋯ | | | | | |

FIG. 16

STORAGE CAPACITY OF FRAME BUFFER : 3 FRAMES
DATA SUPPLY PATTERN :
25P, 1I, 4P, 7P, 10P, 1I, -14I, -11P, ···
REPRODUCTION PATTERN :
25P, 25P, 16I, 16I, 16I, 10P, 10P, 1I, ···

| CODE BUFFER READ Dsync | FRAME BUFFER 1 | 2 | 3 | DISPLAY Vsync |
|---|---|---|---|---|
| 16 I  |      |      |      |      |
| 19 P  | 16 I |      |      |      |
| 22 P  | 16 I | 19 P |      |      |
| 25 P  | 16 I | 19 P | 22 P |      |
| 1 I   | 16 I | 19 P | 25 P | 25 P |
| 4 P   | 16 I | 1 I  | 25 P | 25 P |
| 7 P   | 16 I | 1 I  | 4 P  | 16 I |
| 10 P  | 16 I | 7 P  | 4 P  | 16 I |
| 1 I   | 16 I | 7 P  | 10 P | 16 I |
| -14 I | 1 I  | 7 P  | 10 P | 10 P |
| -11 P | 1 I  | -14 I| 10 P | 10 P |
| -8 P  | 1 I  | -14 I| -11 P| 1 I  |
| . . . . . |   |      |      |      |

FIG. 17

STORAGE CAPACITY OF FRAME BUFFER : 3 FRAMES
DATA SUPPLY PATTERN :
  22P, 1I, 4P, 7P, -14I, -11P, -8P, ···
REPRODUCTION PATTERN :
  22P, 19P, 16I, 7P, 4P, 1I, -8P, ···

| CODE BUFFER READ | FRAME BUFFER | | | DISPLAY |
|---|---|---|---|---|
| Dsync | 1 | 2 | 3 | Vsync |
| 16I | | | | |
| 19P | 16I | | | |
| 22P | 16I | 19P | | |
| 1I | 16I | 19P | 22P | |
| | | | | 22P |
| 4P | 16I | 19P | 1I | |
| | | | | 19P |
| 7P | 16I | 4P | 1I | |
| | | | | 16I |
| -14I | 7P | 4P | 1I | |
| | | | | 7P |
| . . . . | | | | |

FIG. 18

STORAGE CAPACITY OF FRAME BUFFER : 2 FRAMES
DATA SUPPLY PATTERN :
  19P, — , 1I, 4P, — , -14P, -11P, ···
REPRODUCTION PATTERN :
  19P, 16I, 16I, 4P, 1I, 1I, -11P, ···

| CODE BUFFER READ Dsync | FRAME BUFFER 1 | FRAME BUFFER 2 | DISPLAY Vsync |
|---|---|---|---|
| 16I<br>19P | 16I | | |
| — | 16I | 19P | 19P |
| 1I | 16I | 19P | 16I |
| 4P | 16I | 1I | 16I |
| — | 4P | 1I | 4P |
| ..... | | | |

FIG. 19

STORAGE CAPACITY OF FRAME BUFFER : 2 FRAMES

DATA SUPPLY PATTERN :
19P, 1I, 4P, -14P, -11P, ···

REPRODUCTION PATTERN :
19P, 16I, 4P, 1I, -11P, ···

| CODE BUFFER READ Dsync | FRAME BUFFER | | DISPLAY Vsync |
|---|---|---|---|
| | 1 | 2 | |
| 16 I | | | |
| 19 P | 16 I | | |
| 1 I | 16 I | 19 P | |
| | | | 19 P |
| 4 P | 16 I | 1 I | |
| | | | 16 I |
| -14 I | 4 P | 1 I | |
| | | | 4 P |
| -13 P | -14 I | 1 I | |
| | | | 1 I |
| ····· | | | |

FIG. 20

STORAGE CAPACITY OF FRAME BUFFER : 3 FRAMES
DATA SUPPLY PATTERN :
  28P, 27B, 16I, 19P, 22P, 24B, 16I, 19P, 21B, 16I, 18B, 1I, 4P, 7P, 10P, 13P, ···
REPRODUCTION PATTERN :
  28P, 28P, 27B, 25P, 25P, 24B, 22P, 22P, 21B, 19P, 19P, 18B, 16I, 16I, 16I, 13P, ···

| CODE BUFFER READ Dsync | FRAME BUFFER 1 | FRAME BUFFER 2 | FRAME BUFFER 3 | DISPLAY Vsync |
|---|---|---|---|---|
| 16I |  |  |  |  |
| 19P | 16I |  |  |  |
| 22P | 16I | 19P |  |  |
| 25P | 16I | 19P | 22P |  |
| 28P | 25P | 19P | 22P |  |
| 27B | 25P | 28P | 22P |  |
|  |  |  |  | 28P |
| 16I | 25P | 28P | 27B |  |
|  |  |  |  | 28P |
| 19P | 25P | 16I | 27B |  |
|  |  |  |  | 27B |
| 22P | 25P | 16I | 19P |  |
|  |  |  |  | 25P |
| 24B | 25P | 22P | 19P |  |
|  |  |  |  | 25P |
| 16I | 25P | 22P | 24B |  |
|  |  |  |  | 24B |
| 19P | 16I | 22P | 24B |  |
|  |  |  |  | 22P |
| 21B | 16I | 22P | 19P |  |
|  |  |  |  | 22P |
| 16I | 21B | 22P | 19P |  |
|  |  |  |  | 21B |
| 18B | 16I | 22P | 19P |  |
|  |  |  |  | 19P |
| 1I | 16I | 18B | 19P |  |
|  |  |  |  | 19P |
| 4P | 16I | 18B | 1I |  |
|  |  |  |  | 18B |
| 7P | 16I | 4P | 1I |  |
|  |  |  |  | 16I |
| 10P | 16I | 4P | 7P |  |
|  |  |  |  | 16I |
| 13P | 16I | 10P | 7P |  |
|  |  |  |  | 16I |
| — | 13P | 10P | 7P |  |
|  |  |  |  | 13P |
| — | 13P | 10P | 7P |  |
|  |  |  |  | 13P |

FIG. 21

STORAGE CAPACITY OF FRAME BUFFER : 6 FRAMES

DATA SUPPLY PATTERN :
  28P, 27B, 1I, 4P, 7P, 18B, 10P, 13P, 12B, ...

REPRODUCTION PATTERN :
  28P, 28P, 25P, 22P, 19P, 18B, 16I, 13P, 12B, ...

| CODE BUFFER READ Dsync | FRAME BUFFER | | | | | | DISPLAY Vsync |
|---|---|---|---|---|---|---|---|
| | 1 | 2 | 3 | 4 | 5 | 6 | |
| 16I | | | | | | | |
| 19P | 16I | | | | | | |
| 22P | 16I | 19P | | | | | |
| 25P | 16I | 19P | 22P | | | | |
| 28P | 16I | 19P | 22P | 25P | | | |
| 27B | 16I | 19P | 22P | 25P | 28P | | |
| | | | | | | | 28P |
| 1I | 16I | 19P | 22P | 25P | 28P | 27B | |
| | | | | | | | 27B |
| 4P | 16I | 19P | 22P | 25P | 1I | 27B | |
| | | | | | | | 25P |
| 7P | 16I | 19P | 22P | 25P | 1I | 4P | |
| | | | | | | | 22P |
| 18B | 16I | 19I | 22P | 7P | 1I | 4P | |
| | | | | | | | 19P |
| 10P | 16I | 19P | 18B | 7P | 1I | 4P | |
| | | | | | | | 18B |
| 13P | 16I | 10P | 18B | 7P | 1I | 4P | |
| | | | | | | | 16I |
| 12B | 16I | 10P | 13P | 7P | 1I | 4P | |
| | | | | | | | 13P |
| . . . . | | | | | | | |

FIG. 22

STORAGE CAPACITY OF FRAME BUFFER : 3 FRAMES
DATA SUPPLY PATTERN :
  19P, – , 18B, 17B, – , – , 1I, 4P, – , 3B, 2B, – , ···
REPRODUCTION PATTERN :
  19P, 19P, 18B, 17B, 16I, 16I, 16I, 4P, 4P, 3B, 2B, 1I, 1I, 1I, ···

| CODE BUFFER READ | FRAME BUFFER | | | DISPLAY |
|---|---|---|---|---|
| Dsync | 1 | 2 | 3 | Vsync |
| 16I | | | | |
| 19P | 16I | | | |
| — | 16I | 19P | | |
| 18B | 16I | 19P | | 19P |
| 17B | 16I | 19P | 18B | 19P |
| — | 16I | 19P | 17B | 18B |
| — | 16I | 19P | 17B | 17B |
| 1I | 16I | 19P | 17B | 16I |
| 4P | 16I | 19P | 1I | 16I |
| — | 16I | 4P | 1I | 16I |
| .... | | | | 4P |

FIG. 23

STORAGE CAPACITY OF FRAME BUFFER : 4 FRAMES

DATA SUPPLY PATTERN :

28P, − , 27B, − , 26B, − , − , 24B, − , − , 23B, − , 16I, 19P, 21B, − , 20B, − , − , 18B, 17B, 11, 4P, 7P, 10P, 13P, 15B, − , 14B, − , 11, 4P, 12B, − , 11B, 7P, 11, − , ···

REPRODUCTION PATTERN :

28P, 28P, 27B, 27B, 26B, 26B, 25P, 25P, 24B, 24B, 23B, 23B, 22P, 22P, 21B, 21B, 20B, 20B, 19P, 19P, 18B, 18B, 17B, 17B, 16I, 16I, 15B, 15B, 14B, 14B, 13P, 13P, 12B, 12B, 11B, 11B, 10P, 10P, ···

| CODE BUFFER READ Dsync | FRAME BUFFER | | | | DISPLAY Vsync |
|---|---|---|---|---|---|
| | 1 | 2 | 3 | 4 | |
| 16 I | | | | | |
| 19 P | 16 I | | | | |
| 22 P | 16 I | 19 P | | | |
| 25 P | 16 I | 19 P | 22 P | | |
| 28 P | 16 I | 19 P | 22 P | 25 P | |
| — | 16 I | 28 P | 22 P | 25 P | 28 P |
| 27 B | 16 I | 28 P | 22 P | 25 P | 28 P |
| — | 27 B | 28 P | 22 P | 25 P | 27 B |
| 26 B | 27 B | 28 P | 22 P | 25 P | 27 B |
| — | 26 B | 28 P | 22 P | 25 P | 26 B |
| — | 26 B | 28 P | 22 P | 25 P | 26 B |
| 24 B | 26 B | 28 P | 22 P | 25 P | 25 P |
| — | 24 B | 28 P | 22 P | 25 P | 25 P |
| — | 24 B | 28 P | 22 P | 25 P | 24 B |
| 23 B | 24 B | 28 P | 22 P | 25 P | 24 B |
| — | 23 B | 28 P | 22 P | 25 P | 23 B |
| 16 I | 23 B | 28 P | 22 P | 25 P | 23 B |
| 19 P | 23 B | 28 P | 22 P | 16 I | 22 P |
| 21 B | 19 P | 28 P | 22 P | 16 I | 22 P |
| — | 19 P | 21 B | 22 P | 16 I | 21 B |
| 20 B | 19 P | 21 B | 22 P | 16 I | 21 B |

FIG. 24

| CODE BUFFER READ Dsync | FRAME BUFFER | | | | DISPLAY Vsync |
|---|---|---|---|---|---|
| | 1 | 2 | 3 | 4 | |
| — | 19P | 20B | 22P | 16I | 20B |
| — | 19P | 20B | 22P | 16I | 20B |
| 18B | 19P | 20B | 22P | 16I | 19P |
| 17B | 19P | 18B | 22P | 16I | 19P |
| 1I | 19P | 18B | 17B | 16I | 18B |
| 4P | 1I | 18B | 17B | 16I | 18B |
| 7P | 1I | 4P | 17B | 16I | 17B |
| 10P | 7P | 4P | 17B | 16I | 17B |
| 13P | 7P | 4P | 10P | 16I | 16I |
| 15B | 7P | 13P | 10P | 16I | 16I |
| — | 15B | 13P | 10P | 16I | 15B |
| 14B | 15B | 13P | 10P | 16I | 15B |
| — | 14B | 13P | 10P | 16I | 14B |
| 1I | 14B | 13P | 10P | 16I | 14B |
| 4P | 1I | 13P | 10P | 16I | 13P |
| 12B | 1I | 13P | 10P | 4P | 13P |
| — | 12B | 13P | 10P | 4P | 12B |
| 11B | 12B | 13P | 10P | 4P | 12B |
| 7P | 11B | 13P | 10P | 4P | 11B |
| 1I | 11B | 7P | 10P | 4P | 11B |

FIG. 25

| CODE BUFFER READ Dsync | FRAME BUFFER | | | | DISPLAY Vsync |
|---|---|---|---|---|---|
| | 1 | 2 | 3 | 4 | |
| — | 1 I | 7 P | 10 P | 4 P | 10 P |
| 9 B | 1 I | 7 P | 10 P | 4 P | |
| | | | | | 10 P |
| — | 1 I | 7 P | 10 P | 9 B | |
| | | | | | 9 B |
| 8 B | 1 I | 7 P | 10 P | 9 B | |
| | | | | | 9 B |
| — | 1 I | 7 P | 10 P | 8 B | |
| . . . . | | | | | |

FIG. 26

STORAGE CAPACITY OF FRAME BUFFER : 3 FRAMES

DATA SUPPLY PATTERN :

28P, 27B, — , — , 26B, — , 16I, 19P, 22P, 24B, 23B, 16I, 19P, — , 21B, — , 20B, — , 16I, — , 18B, — , 17B, 1I, 4P, 7P, 10P, 13P, — , — , — , — , 12B, ⋯

REPRODUCTION PATTERN :

28P, 28P, 27B, 27B, 26B, 26B, 25P, 25P, 25P, 24B, 23B, 23B, 22P, 22P, 21B, 21B, 20B, 20B, 19P, 19P, 18B, 18B, 17B, 17B, 16I, 16I, 16I, 13P, 13P, 13P, 13P, 13P, 12B, ⋯

| CODE BUFFER READ | FRAME BUFFER | | | DISPLAY |
|---|---|---|---|---|
| Dsync | 1 | 2 | 3 | Vsync |
| 16I | | | | |
| 19P | 16I | | | |
| 22P | 16I | 19P | | |
| 25P | 16I | 19P | 22P | |
| 28P | 16I | 25P | 22P | |
| 27B | 28P | 25P | 22P | |
| | | | | 28P |
| — | 28P | 25P | 27B | |
| | | | | 28P |
| | 28P | 25P | 27B | |
| | | | | 27B |
| 26B | 28P | 25P | 27B | |
| | | | | 27B |
| — | 28P | 25P | 26B | |
| | | | | 26B |
| 16I | 28P | 25P | 26B | |
| | | | | 26B |

FIG. 27

| CODE BUFFER READ | FRAME BUFFER | | | DISPLAY |
|---|---|---|---|---|
| Dsync | 1 | 2 | 3 | Vsync |
| 19 P | 16 I | 25 P | 26 B | |
| 22 P | 16 I | 25 P | 19 P | 25 P |
| 24 B | 22 P | 25 P | 19 P | 25 P |
| 23 B | 22 P | 25 P | 24 B | 25 P |
| 16 I | 22 P | 25 P | 23 B | 24 B |
| 19 P | 22 P | 16 I | 23 B | 23 B |
| — | 22 P | 16 I | 19 P | 23 B |
| 21 B | 22 P | 16 I | 19 I | 22 P |
| — | 22 P | 21 B | 19 P | 22 P |
| 20 B | 22 P | 21 B | 19 P | 21 B |
| — | 22 P | 20 B | 19 P | 21 B |
| 16 I | 22 P | 20 B | 19 P | 20 B |
| — | 16 I | 20 B | 19 P | 20 B |
| 18 B | 16 I | 20 B | 19 P | 19 P |
| — | 16 I | 18 B | 19 P | 19 P |
| 17 B | 16 I | 18 B | 19 P | 18 B |
| 1 I | 16 I | 17 B | 19 P | 18 B |
| 4 P | 16 I | 17 B | 1 I | 17 B |
| 7 P | 16 I | 4 P | 1 I | 17 B |
| 10 P | 16 I | 4 P | 7 P | 16 I |
| 13 P | 16 I | 10 P | 7 P | 16 I |
| — | 13 P | 10 P | 7 P | 16 I |
| | | | | 13 P |

FIG. 28

| CODE BUFFER READ | FRAME BUFFER | | | DISPLAY |
|---|---|---|---|---|
| Dsync | 1 | 2 | 3 | Vsync |
| — | 13P | 10P | 7P | 13P |
| — | 13P | 10P | 7P | 13P |
| — | 13P | 10P | 7P | 13P |
| 12B | 13P | 10P | 7P | 13P |
| — | 13P | 10P | 12B | 12B |
| ..... | | | | |

FIG. 29

STORAGE CAPACITY OF FRAME BUFFER : 3 FRAMES

DATA SUPPLY PATTERN :

28P, 27B, —, —, 26B, —, 16I, 19P, 22P, 24B, 23B, 16I, 19P, —, 21B, —, 20B, —, 16I, —, 18B, —, 1I, 4P, 7P, 10P, 13P, 14B, 1I, 4P, 7P, 10P, 12B, ···

REPRODUCTION PATTERN :

28P, 28P, 27B, 27B, 26B, 26B, 25P, 25P, 25P, 24B, 23B, 23B, 22P, 22P, 21B, 21B, 20B, 20B, 19P, 19P, 18B, 18B, 18B, 16I, 16I, 16I, 16I, 14B, 14B, 13P, 13P, 13P, 12B, ···

| CODE BUFFER READ Dsync | FRAME BUFFER 1 | 2 | 3 | DISPLAY Vsync |
|---|---|---|---|---|
| 16I | | | | |
| 19P | 16I | | | |
| 22P | 16I | 19P | | |
| 25P | 16I | 19P | 22P | |
| 28P | 16I | 25P | 22P | |
| 27B | 28P | 25P | 22P | |
| — | 28P | 25P | 27B | 28P |
| — | 28P | 25P | 27B | 28P |
| 26B | 28P | 25P | 27B | 27B |
| — | 28P | 25P | 26B | 27B |
| | | | | 26B |

FIG. 30

| CODE BUFFER READ Dsync | FRAME BUFFER | | | DISPLAY Vsync |
|---|---|---|---|---|
| | 1 | 2 | 3 | |
| 16 I | 28 P | 25 P | 26 B | 26 B |
| 19 P | 16 I | 25 P | 26 B | 25 P |
| 22 P | 16 I | 25 P | 19 P | 25 P |
| 24 B | 22 P | 25 P | 19 P | 25 P |
| 23 B | 22 P | 25 P | 24 B | 24 B |
| 16 I | 22 P | 25 P | 23 B | 23 B |
| 19 P | 22 P | 16 I | 23 B | 23 B |
| — | 22 P | 16 I | 19 P | 22 P |
| 21 B | 22 P | 16 I | 19 I | 22 P |
| — | 22 P | 21 B | 19 P | 21 B |
| 20 B | 22 P | 21 B | 19 P | 21 B |
| — | 22 P | 20 B | 19 P | 20 B |
| 16 I | 22 P | 20 B | 19 P | 20 B |
| — | 16 I | 20 B | 19 P | 19 P |
| 18 B | 16 I | 20 B | 19 P | 19 P |
| — | 16 I | 18 B | 19 P | 18 B |
| 1 I | 16 I | 18 B | 19 P | 18 B |
| 4 P | 16 I | 17 B | 1 I | 18 B |
| 7 P | 16 I | 4 P | 1 I | 16 I |
| 10 P | 16 I | 4 P | 7 P | 16 I |
| 13 P | 16 I | 10 P | 7 P | 16 I |
| 14 B | 16 I | 10 P | 13 P | 16 I |
| 1 I | 16 I | 14 B | 13 P | 14 B |

FIG. 31

| CODE BUFFER READ Dsync | FRAME BUFFER | | | DISPLAY Vsync |
|---|---|---|---|---|
| | 1 | 2 | 3 | |
| 4 P | 1 I | 14 B | 13 P | 14 B |
| 7 P | 1 I | 4 P | 13 P | 13 P |
| 10 P | 7 P | 4 P | 13 P | 13 P |
| 12 B | 7 P | 10 P | 13 P | 13 P |
| — | 12 B | 10 P | 13 P | 12 B |
| . . . . | | | | |

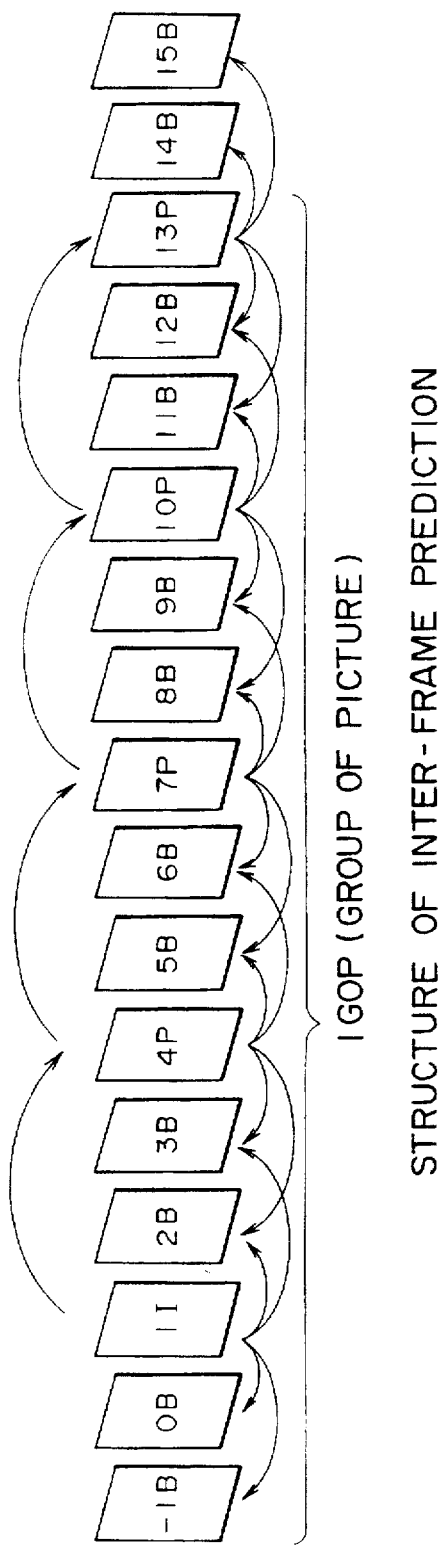
FIG. 33A  STRUCTURE OF INTER-FRAME PREDICTION
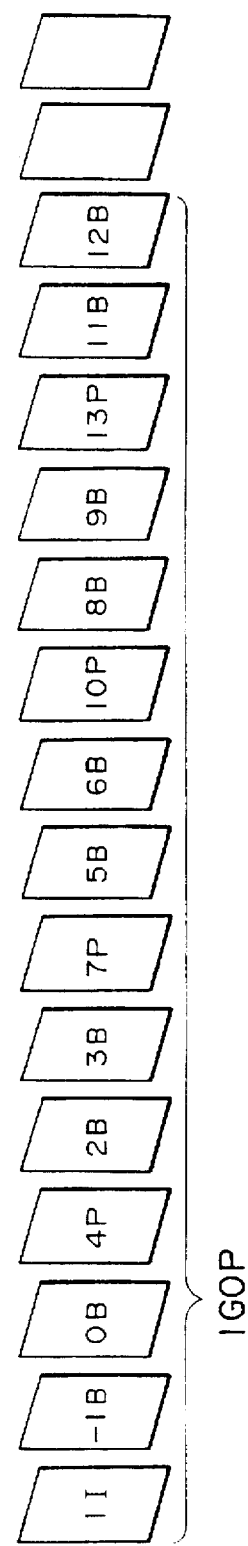
FIG. 33B  STRUCTURE OF ON-MEDIUM FRAMES

FIG. 34A ORIGINAL PICTURES

FIG. 34B CODED PICTURES

FIG. 34C ON-MEDIUM PICTURES

FIG. 34D DECODED PICTURES

FIG. 34E NORMAL REPRODUCED PICTURES

METHOD AND APPARATUS FOR REPRODUCING CODED DATA IN WHICH THE CODED DATA IS DECODED IN REVERSE ORDER OF DISPLAY

BACKGROUND OF THE INVENTION

The present invention relates to a method and an apparatus for special reproduction of coded data stored via communication media or the like or coded video or audio data read out from recording media such as disks. And more particularly, the invention is adapted for reverse reproduction of coded data.

In recording media such as digital video disks (hereinafter referred to as DVD), communication media such as LAN (Local Area Network) or broadcasting media such as satellites which are used for processing video and audio signals converted into digital data, it is usual that the data are digitally compressed and coded so that the video and audio signals can be processed efficiently. One of the data compression and coding systems proposed for that purpose is the MPEG (Motion Picture coding Experts Group) system. Now an exemplary MPEG coder will be described below with reference to FIG. 32.

The MPEG coder is so designed as to perform data compression of a video input signal by executing any one of the following three predictive coding modes, wherein the digitized video input signal is supplied first to a motion detector 101 which detects a motion vector for motion compensative prediction per minimum unit of the motion compensative prediction.

Thereafter predictive coding of the signal is performed in a next predictive coding circuit, wherein one of the following three predictive coding modes is executed to obtain: (1) an intra-frame coded picture (I-picture) by coding the video input signal within a frame; (2) an inter-frame forward predictive coded picture (P-picture) by coding the video input signal only in a forward direction; or (3) a bidirectionally predictive coded picture (B-picture) by coding the video input signal in both forward and backward directions.

More specifically, in a DCT 103 of the predictive coding circuit, the video input signal supplied thereto via a subtracter 102 is processed through discrete cosine transform (DCT) which is a kind of Fourier transform, and a DCT coefficient obtained as a result of such transform is quantized in a quantizer (Q) 104. Subsequently to the quantization, the signal is variable-length coded in a variable-length coder (VLC) 109 where a code of a length different depending on the incidence probability is allocated.

The coded signal thus quantized is dequantized in a dequantizer (IQ) 105, and then is supplied to an inverse DCT (IDCT) 106 where the signal is processed through inverse discrete cosine transform. Subsequently an output of a frame memory predictor 108 is added thereto to consequently reproduce the original video signal. The reproduced video signal is supplied as a prediction signal to the subtracter 102 so as to be subtracted from the input video signal, whereby a difference signal between the input video signal and the prediction signal is outputted from the subtracter 102.

Accordingly the coded signal outputted from the quantizer 104 is a difference signal, and since this difference signal is processed through discrete cosine transform to be thereby quantized, the coded signal is compressed.

The coded signal thus compressed is then supplied to the variable-length coder 109, where entropy coding is executed on the basis of the occurrence frequency deflection, so that the code is further compressed.

Thereafter in a multiplexer 110, the compressed coded signal is multiplexed with the prediction mode data indicative of the I-picture, P-picture or B-picture and the motion vector data. However, since the multiplexed data are generated at an irregular rate, such data are once stored in a buffer 111 and then are outputted therefrom at a fixed code rate.

In order to fix the average code rate, the code quantity may be controlled by changing the quantization scale factor q of the quantizer 104 in accordance with the code quantity stored in the buffer 111.

FIG. 33A shows an exemplary structure of inter-frame prediction obtained among the predictive-coded frames.

A data unit termed a GOP (Group of Pictures) may be composed of, e.g., 15 frames as illustrated in this diagram. In this case, since a random access is necessary in one GOP, at least one frame of an I-picture is required within the GOP, so that there are 1 frame of an I-picture, 4 frames of P-pictures predicted from the temporally preceding I-pictures or P-pictures, and remaining 10 frames of B-pictures predicted from the temporally preceding and succeeding I-pictures or P-pictures. A GOP is a coding unit corresponding to each segment of one sequence of motion pictures.

More specifically, as indicated by arrows in FIG. 33A, an I-picture 1I is coded by intra-frame prediction within that frame alone, a P-picture 4P is coded by inter-frame prediction with reference to the I-picture 1I, a P-picture 7P is coded by inter-frame prediction with reference to the P-picture 4P, a P-picture 10P is coded by inter-frame prediction with reference to the P-picture 7P, and a P-picture 13P is coded by inter-frame prediction with reference to the P-picture 10P. Further, B-pictures 2B and 3B are coded by inter-frame prediction with reference to both of the I-picture 1P and the P-picture 4P, and B-pictures 5B and 6B are coded by inter-frame prediction with reference to both of the P-picture 4P and the P-picture 7P. Similarly, subsequent pictures are coded by such prediction in the manner indicated by arrows.

The numbers of I, P and B represent the ordinal numbers of original pictures.

In decoding the predictive-coded pictures mentioned, the I-picture can be decoded alone since it is predictive-coded within the frame. However, as any P-picture is coded with reference to the temporally preceding I-picture or P-picture, such preceding I-picture or P-picture is required at the decoding time. Similarly, in decoding any B-picture coded with reference to the temporally preceding and succeeding I-pictures or P-pictures, such preceding and succeeding I-pictures or P-pictures are required.

For this reason, the pictures are positionally changed as illustrated in FIG. 33B so that the pictures required at the decoding time can be decoded in advance.

As illustrated in FIG. 34A, such positional changes are so made that the I-picture 1I precedes the B-pictures −B and 0B since the B-pictures −1B and 0B require the I-picture 1I at the decoding time, and also that the P-picture 4P precedes the B-pictures 2B and 3B since the B-pictures 2B and 3B require the I-picture 1I and the P-picture 4P. Similarly, the pictures are positionally so changed that the P-picture 7P precedes the B-pictures 5B and 6B since the B-pictures 5B and 6B requires the P-pictures 4P and 7P at the decoding time, and also that the P-picture 10P precedes the B-pictures 8B and 9B since the B-pictures 8B and 9B require the P-pictures 7P and 10P at the decoding time. In the same manner, such positional changes are so made that the P-picture 13P precedes the B-pictures 11B and 12B.

The I-, P- and B-pictures thus arranged in the order shown in FIG. 34B are converted into on-medium coded video data in FIG. 34C so as to be recordable on a recording medium such as a DVD. Then the on-medium coded video data are read out therefrom to become decoded video data in the order shown in FIG. 34D. Subsequently, in displaying normal reproduced pictures, the decoded video data are rearranged in the order which is indicated by suffixes in FIG. 34C and corresponds to the original picture order, whereby normal pictures are displayed on a display device.

When displaying special reproduced pictures which are in a reverse direction of reproduction, it is necessary to display the pictures in the reverse order of the original pictures shown in FIG. 34A, as 12B, 11B, 10P, 9B . . . and so on. Therefore, in the case of decoding the B-picture 12B for example, since this B-picture 12B is a coded picture predicted from the P-pictures 10P and 13P, these P-pictures 10P and 13P need to be decoded in advance. Further the P-picture 7P is required for obtaining the decoded P-picture 10P, and the P-picture 4P is required for obtaining the P-picture 7P, and the I-picture 1I is required for obtaining the P-picture 4P.

Consequently, even in such reverse reproduction, it is necessary to perform successive operations of first reading out and decoding the I-picture 1I, then decoding the P-picture 4P, subsequently decoding the P-picture 7P and next decoding the P-picture 10P. It is further necessary to decode the P-picture 13P from the P-picture 10P to finally achieve desired decoding of the B-picture 12B from the P-pictures 10P and 13P.

In succession, the B-picture 11B can be decoded from the P-pictures 10P and 13P, and further the P-picture 10P can be immediately outputted since it has already been decoded. However, as the P-picture 7P is required for decoding the B-pictures 9B and 8B, it is necessary to decode the P-picture 7P by reading out the I-picture 1I again and then decoding the P-pictures sequentially.

For reversely reproducing the video data of the MPEG standard in the reverse order of the original pictures, a greater number of decoding steps are needed in comparison with ordinary reproduction and a longer time is required until display of the pictures, so that it is necessary to increase the data transfer rate and so forth to the decoder for shortening the delay time. Furthermore, due to the limited storage capacity of a frame memory, I- and P-pictures need to be decoded so many times.

Therefore, it has been customary in the prior art to solve the above problems by decoding and displaying merely the I-picture in a reverse reproduction mode.

However, when only the I-picture alone is displayed, merely one picture is obtained per 15 frames for example as shown in FIG. 33, and it follows that an extremely reduced number of the pictures are displayed to consequently become unnatural.

SUMMARY OF THE INVENTION

It is therefore an object of the present invention to provide improvements in a method and an apparatus for special reproduction of coded data, wherein special reproduction in a reverse direction and so forth can be achieved to realize natural reproduced pictures on a display device without the necessity of raising a coded-data transfer rate to a decoder or increasing the storage capacity of a frame memory either.

According to one aspect of the present invention, there is provided a coded-data special reproduction method which reads out and decodes a unit group of intra-frame coded data, inter-frame forward predictive coded data and bidirectionally predictive coded data, then writes the decoded data into a frame buffer means and, after reading out the data from the frame buffer means, displays such data. The method comprises the steps of: continuously decoding portions of the intra-frame coded data and the inter-frame forward predictive coded data constituting the unit group read out, while intermittently decoding the remaining coded data; subsequently writing the decoded data in the frame buffer means; then reading out the data from the frame buffer means in the reverse order of the original pictures; and displaying the pictures thus read out.

In the coded-data special reproduction method mentioned above, some portion of the bidirectionally predictive coded data also is decoded intermittently.

In decoding the unit group of data by the above method, priority is granted to the intra-frame coded data and the inter-frame forward predictive coded data anterior to the intra-frame coded data appearing first in the unit data.

Further, the unit group of data is composed of a block consisting of two or more unit data.

And when a picture to be displayed next has not yet been written in the frame buffer, the picture being displayed now is continuously displayed.

According to another aspect of the present invention, there is provided an apparatus capable of carrying out the above coded-data special reproduction method. This apparatus comprises: a buffer for storing read unit data composed of intra-frame coded data, inter-frame forward predictive data and bidirectionally predictive coded data; a decoder for decoding the coded data obtained from the buffer; and a frame buffer for storing the respective coded data decoded by the decoder; wherein some portions of the intra-frame coded data, the inter-frame forward predictive coded data and the bidirectionally predictive coded data constituting the unit group are read out continuously from the buffer and are decoded, while the remaining portions of the data are read out intermittently therefrom and are decoded, and after the decoded data are written in the frame buffer, the data are read out from the frame buffer in the reverse order of the original pictures and then are displayed.

In the coded-data special reproduction apparatus mentioned above, some portion of the bidirectionally predictive coded data also is decoded intermittently.

In decoding the unit group of data in the above apparatus, priority is granted to the intra-frame coded data and the inter-frame forward predictive coded data anterior to the intra-frame coded data appearing first in the unit data.

Further, the unit group of data is composed of a block consisting of two or more unit data.

And when a picture to be displayed next has not yet been written in the frame buffer, the picture being displayed now is continuously displayed.

Thus, according to the present invention, some portions of I-picture and P-picture data constituting the unit group are continuously decoded at the time of special reproduction, while the remaining picture data are intermittently decoded and transferred to a display means, thereby reducing the number of required decoding steps. Consequently it becomes unnecessary to raise the data transfer rate to the decoder, hence eliminating failure in the data flow. Furthermore, the reproduced pictures can be displayed with reduction of the display delay time without the necessity of increasing the storage capacity of the frame buffer required for special reproduction.

The above and other features and advantages of the present invention will become apparent from the following description which will be given with reference to the illustrative accompanying drawings.

BRIEF DESCRIPTION OF THE DRAWINGS

FIGS. 3A to 3E are timing charts of signals produced in an example of special reproduction;

FIG. 5 is a schematic table of an example in performing the special reproduction of FIG. 4;

FIG. 6 is a schematic table of an example in performing reverse reproduction with I- and P-pictures;

FIG. 7 is a schematic table of another example in performing reverse reproduction with I- and P-pictures;

FIG. 8 is a schematic table of an example in performing reverse reproduction with I-, P- and B-pictures;

FIG. 9 is a schematic table of another example in performing reverse reproduction with I- and P-pictures;

FIG. 10 is a schematic table of an example in performing reverse reproduction with entire I- and P-pictures;

FIG. 11 is a schematic table of another example in performing reverse reproduction with entire I- and P-pictures;

FIG. 12 is a schematic table of an example in performing reverse reproduction with approximately alternate I- and P-pictures;

FIG. 13 is a schematic table of another example in performing reverse reproduction with I- and P-pictures;

FIG. 14 is a schematic table of an example in performing reverse reproduction with I- and P-pictures while not displaying any same pictures in succession;

FIGS. 15 to 19 are schematic tables of other examples in performing reverse reproduction with I- and P-pictures;

FIG. 20 is a schematic table of an example in performing reverse reproduction with entire I- and P-pictures and alternate B-pictures;

FIG. 21 is a schematic table of an example in performing reverse reproduction with entire I- and P-pictures and some B-pictures while not displaying any same pictures in succession;

FIG. 22 is a schematic table of an example in performing partial reverse reproduction with entire I-, P- and B-pictures;

FIGS. 23 to 25 are schematic tables of an example in performing reverse reproduction with entire I-, P- and B-pictures;

FIGS. 26 to 28 are schematic tables of an example in performing reverse reproduction with approximately entire I-, P- and B-pictures;

FIGS. 29 to 31 are schematic tables of another example in performing reverse reproduction with approximately entire I-, P- and B-pictures;

FIGS. 33A and 33B show an inter-frame prediction structure and a medium frame structure, respectively; and FIGS. 34A to 34E show the relationship among original pictures, coded pictures, on-medium pictures, decoded pictures and normal reproduced pictures.

DESCRIPTION OF THE PREFERRED EMBODIMENTS

Figure 1:
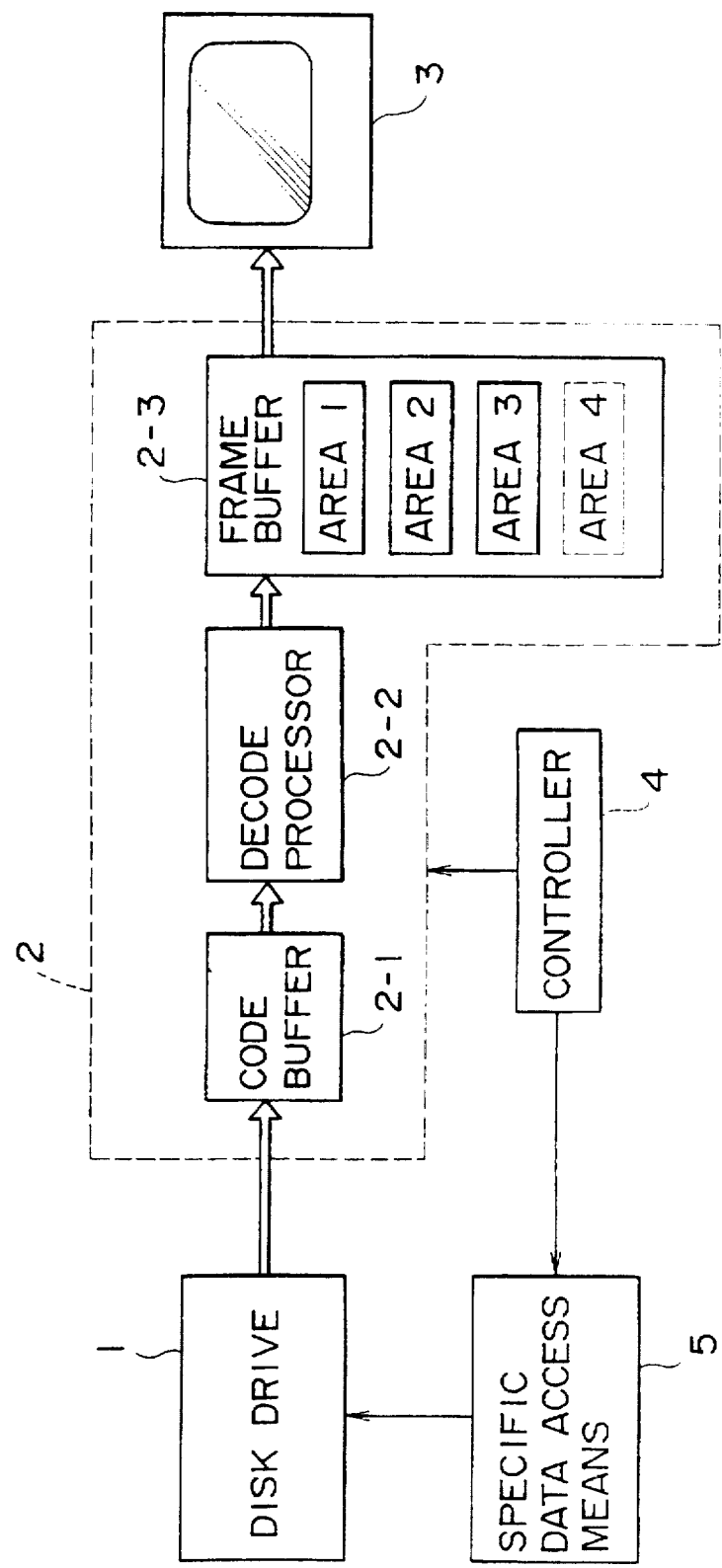
FIG. 1 is a block diagram showing the constitution of an exemplary embodiment which represents the coded-data special reproduction apparatus of the present invention.

FIG. 1 shows the constitution of an exemplary embodiment which represents a data special reproduction apparatus contrived for carrying out the coded-data special reproduction method of the present invention, wherein a recording medium employed is a disk.

In this diagram, reference numeral 1 denotes a disk drive for reading out from the disk the coded data recorded through compression according to the MPEG standard. There are also shown a decoder 2 which consists of a code buffer 2-1, a decode processor 2—2 and a frame buffer 2-3 for decoding the data read out from the disk drive 1; a display device 3 for displaying the data decoded by the decoder 2; a controller 4 for controlling the decoder, by supplying control data to a specific data access means 5, in a manner to read out the specific data from the disk drive 1 and to obtain normal reproduced signal or special reproduced signal; and the specific data access means 5 for driving the disk drive 1 in a manner to read out the specific data from the disk under control of the controller 4.

Now an explanation will be given on the operation performed in a normal reproduction mode in the data special reproduction apparatus of the above constitution. On the disk, there are recorded I-, P- and B-pictures which are coded according to the MPEG standard in the format of FIG. 34C. In order to decode such recorded picture data in the order of FIG. 34D, specific picture data included in the video data is read out by the specific data access means 5 and then is supplied to and stored temporarily in the decode buffer 2-1 of the decoder 2. Subsequently the data thus stored in the code buffer 2-1 is read out therefrom and is decoded by the decode processor 2—2, so that the picture data are decoded in the order of FIG. 34D. And the decoded pictures are supplied to the frame buffer 2-3.

The frame buffer 2-3 has a memory capacity sufficient for storing three frames which are composed usually of an area 1, an area 2 and an area 3. And the decoded pictures supplied to the frame buffer 2-3 are stored in predetermined areas respectively.

Thereafter the pictures are read out from the frame buffer 2-3 in the order of FIG. 34E and then are visually represented on the display device 3, whereby the reproduced pictures are displayed in the order of the original ones.

Next the operation performed in a special reproduction mode will be described below with regard to an example of reverse reproduction. Since the MPEG2 standard includes both cases with and without the aforementioned GOP structure, a description will be given on an assumption that a plurality of MPEG-coded pictures constitute a unit of group data (GD).

Figure 2A:
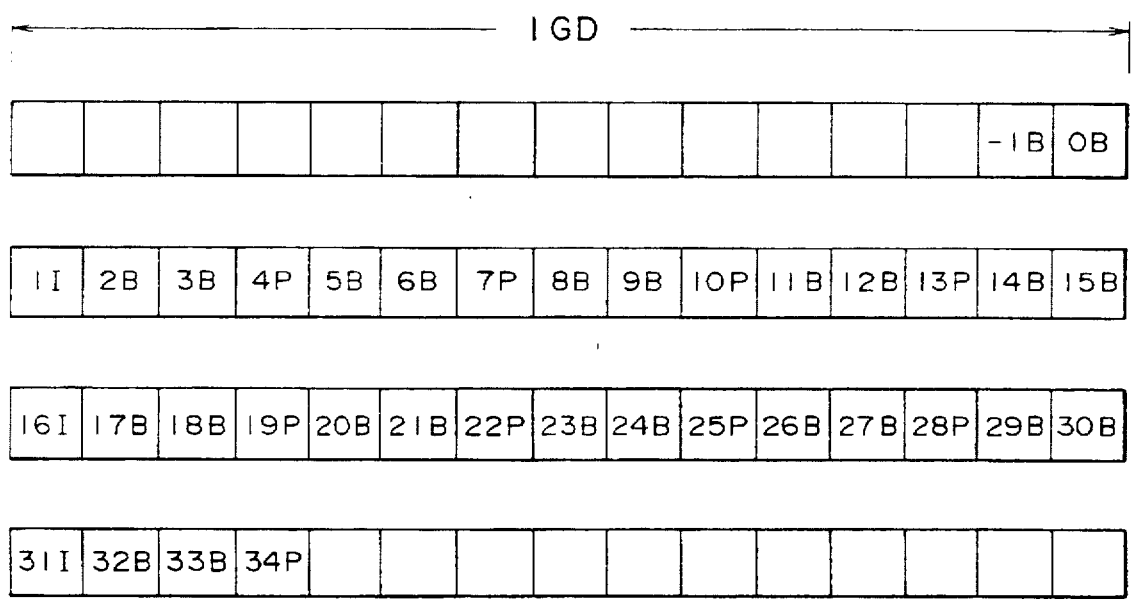
FIGS. 2A and 2B show frame structures of group data.
Figure 2B:
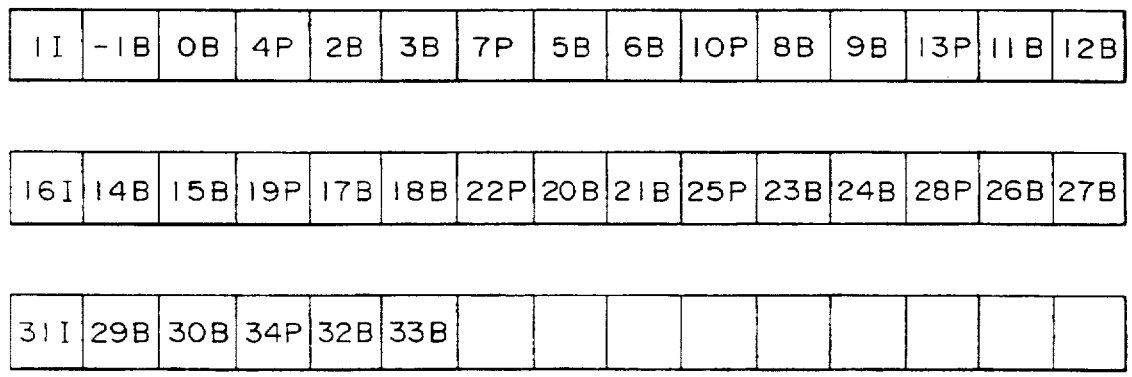

FIGS. 2A and 2B show an exemplary GD structure where one group data is composed of 15 pictures, in which n denotes a distance between an I-picture and a P-picture or a distance between P-pictures, and m denotes a distance between I-pictures.

More specifically, FIG. 2A shows an example of pictures arranged in four GD, and FIG. 2B shows actual bit streams rearranged on a recording medium in the decoding order in a normal reproduction mode.

Referring now to FIGS. 3A to 3E, an explanation will be given on an exemplary data supply pattern supplied to the decoder and an exemplary data output pattern read out from the decoder and displayed when the MPEG-coded pictures thus arranged on the recording medium are reproduced in a reverse direction. In this case, it is supposed that the frame buffer 2-3 has areas sufficient for storing four pictures.

First in FIG. 3A, Dsync is a timing signal according to which the pictures read out from the disk drive 1 are written in the code buffer 2-1. This signal Dsync has a period of 2 V corresponding to a double of a vertical synchronizing signal Vsync, i.e., a period of 1 frame. Therefore the code buffer 2-1 is triggered by the signal Dsync in such a manner that the pictures read out from the disk drive 1 are written in the period of 2 V as shown in FIG. 3B. More specifically, under control of the specific data access means 5, pictures are read out from the disk drive 1 in the order of 16I, 19P, 22P, 25P, 28P, 27B, 16I, 19P, 24B, . . . and so forth, as shown in FIG. 3B.

The pictures stored in the code buffer 2-1 are decoded by the decode process means 2—2 in such a manner that the decoding of each picture is completed within the period of 2 V from the start thereof, and the decoded pictures are stored successively in the frame buffer 2-3, as shown in FIG. 3C.

More specifically, the I-picture 16I started to be decoded synchronously with timing td1 is decodable alone without reference to any other picture since it is an intra-frame coded picture, and in synchronism with td2 of Dsync after a lapse of 2 V therefrom, the data of the decoded I-picture 16I starts to be stored in the area 1 of the frame buffer 2-3.

Then in synchronism with timing td3 after a lapse of 2 V therefrom, the P-picture 19P decoded with reference to the I-picture 16I starts to be stored in the area 2. Subsequently in synchronism with timing td3 after a lapse of 2 V, the P-picture 22P decoded with reference to the P-picture 19P starts to be stored in the area 3; and next in synchronism with timing td5 after a lapse of 2 V, the P-picture 25P decoded with reference to the P-picture 22P starts to be stored in the area 4. And further in synchronism with timing td6 after a lapse of 2 V therefrom, the P-picture 28P decoded with reference to the P-picture 25P starts to be stored in the area 1 by overwriting.

Similarly, the B-picture 27B is decoded with reference to the P-picture 25P stored in the area 4 and also to the P-picture 28P stored in the area 1, and then starts to be stored in the area 2 synchronously with timing td7.

Subsequently the respective areas of the frame buffer 2-3 are overwritten successively as shown in FIG. 3C, whereby the decoded pictures are stored therein.

The decoded pictures thus stored in the frame buffer 2-3 are supplied to the display device 3 in a manner to be in the reverse order of the original pictures and are displayed thereon, but the timing to read out such decoded pictures from the frame buffer 2-3 conforms to the timing of the vertical synchronizing signal Vsync which is shown in FIG. 3D and has, as compared with the aforementioned signal Dsync, a deviation of 1 field corresponding to the period V of the vertical synchronizing signal.

For example, regarding the P-picture 28P started to be stored in the area 1 synchronously with timing td6 of Dsync, the data thereof starts to be transferred to the display device 3 synchronously with timing tv1 of Vsync after a lapse of V from the timing td6. In this case, storage of the P-pictre 28P in the area 1 is completed latest synchronously with timing td7 after a lapse of 2 V. However, since one field of the P-picture 28P can be transferred to the display device 3 at the time point td7 , the data to be displayed can be transferred properly to the display device 3 without any failure.

As the data are read out from the disk driver 1 in the picture order of FIG. 3B and then are decoded, the data of the decoded pictures can be transferred to and displayed on the display device 3 in the order of FIG. 3C.

More specifically, the P-picture 28P starts to be transferred from the area 1 to the display device 3 synchronously with timing tv1 of Vsync; the B-picture 27B starts to be transferred from the area 2 to the display device 3 synchronously with timing tv2; the P-picture 25P starts to be transferred from the area 4 to the display device 3 synchronously with timing tv4 ; the B-picture 24B starts to be transferred from the area 2 to the display device 3 synchronously with timing tv5 ; and the P-picture 22P starts to be transferred from the area 3 to the display device 3 synchronously with timing tv7 . Thereafter the B-picture 21B, P-picture 19P, B-picture 18B, I-picture 16I . . . and so forth are transferred from the respective areas to the display device 3 in this order.

Consequently the video signals of the above P-picture 28P, B-picture 27B, P-picture 25P, B-picture 24B, P-picture 22P, B-picture 21B, P-picture 19P, B-picture 18B, I-picture 16I . . . and so forth are displayed on the display device 3 in this order, whereby the pictures reproduced in the reverse direction can be visually represented on the display device 3.

Figure 4B:
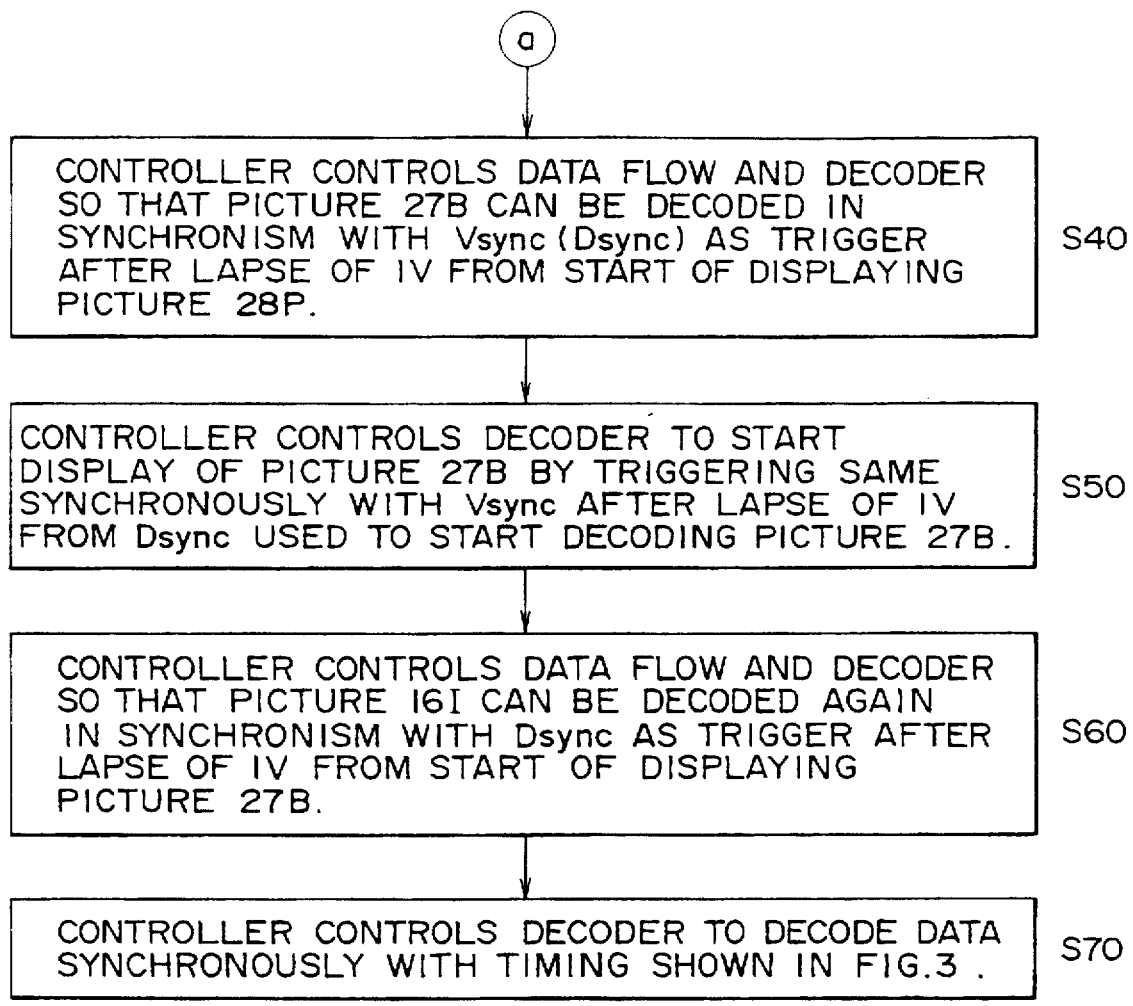
FIG. 4 is a flow chart showing the operation performed in special reproduction.
Figure 4:
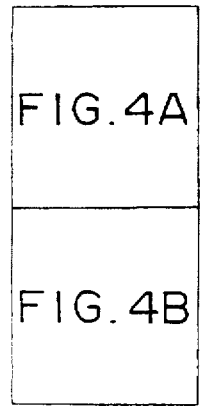
Figure 32:
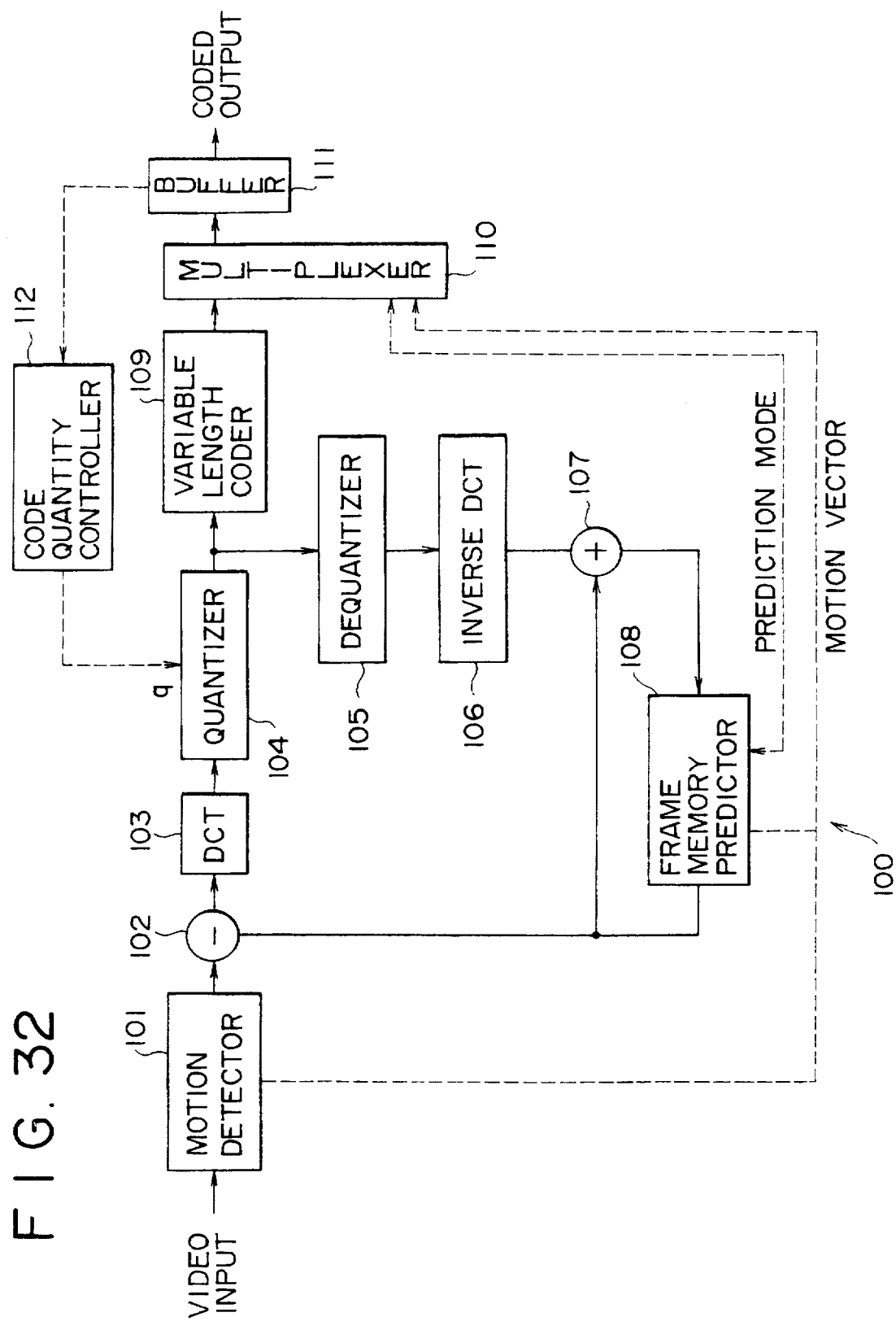
FIG. 32 is a block diagram showing the construction of an MPEG coder.

FIG. 4 is a flow chart showing the operation of the controller 4 performed in this case.

When the operation is switched to a reverse reproduction mode, the routine of this flow chart is started. First at step S10, the data of pictures 16I, 19I, 22P and 25P are supplied to the decoder successively to be decoded therein, and the resultant decoded data are written respectively in the corresponding area 1, area 2, area 3 and area 4 of the frame buffer in the decoder. Next at step S20, the data of P-picture 28P is transferred to the decoder to be decoded therein, and the decoded data is written in the non-displayed area of the frame buffer. In selection of such write area, the controller previously stores divisions where pictures are not displayed, being displayed and already displayed respectively, then determines the picture reproducible by the least number of times of decoding operations when the data is once decoded, and overwrites that area. In this exemplary case, the area 1 with the I-picture 16I written therein is determined, and the decoded P-picture 28P is overwritten in the area 1.

Subsequently at step S30, the controller 4 controls the decoder 2 in such a manner as to start display of the P-picture 28P by triggering the same synchronously with Vsync after a lapse of 1 V from the Vsync (Dsync) used to start decoding the P-picture 28P.

Next at step S40, the controller 4 executes its control action for reading out the data from the disk drive 1 so that the B-picture 27B can be decoded in synchronism with Vsync (Dsync) as a trigger after a lapse of 1 V from the start of displaying the P-picture 28P, and also that the P-pictures 25P and 28P can be read out from the frame buffer 2-3 and be decoded.

Thereafter at step S50, the controller 4 controls the decoder 2 in a manner to start display of the B-picture 27B by triggering the same synchronously with Vsync after a lapse of 1 V from the Dsync used to start decoding the B-picture 27B.

Further at step S60, the controller 4 executes its control action for enabling the decoder 2 to read out the data from the disk drive 1 and to decode the data so that the I-picture 16I can be decoded again in synchronism with Dsync as a trigger after a lapse of 1 V from the start of displaying the B-picture 27B.

And finally at step S70, the controller 4 controls the decoder 2 to decode the data synchronously with the timing shown in FIG. 3.

Thus, in the coded-data reproduction apparatus of the present invention, there exist data portions where, in a special reproduction mode, I- and P-pictures are decoded continuously, and data portions where such pictures are decoded intermittently. And B-pictures are decoded intermittently. The reason is based on that the controller 4 controls both the decoder 2 and the specific data access means 5 in such a manner as not to cause failure in the data flow without the necessity of raising the data transfer rate to the decoder 2.

In this case, decoding is performed with priority granted to the I-picture decodable alone and the P-picture decodable with reference merely to the immediately preceding I-picture or P-picture in the forward direction. And in case the next picture data to be supplied to the display device 3 is not stored in the frame buffer 2-3, the picture being displayed now is supplied continuously to the display device.

It is to be understood here that the data supply patterns of FIGS. 3A to 3E in supplying the data to the decoder and the data output patterns thereof in reading out the data from the decoder and displaying such data are merely illustrative examples, and a variety of patterns are applicable in a special reproduction mode. Hereinafter various patterns adapted for special reproduction will be described, wherein the patterns shown in FIGS. 3A to 3E are represented as FIG. 5.

In each of FIGS. 5 through 31, a column "Code buffer read Dsync" includes the pictures read out from the code buffer 2-1 synchronously with the signal Dsync shown in FIG. 3A. A column "Frame buffer" is divided into fractional columns of numerals indicating the individual areas of the frame buffer 2-3, wherein there are included the pictures written in such areas synchronously with the signal Dsync as shown in FIG. 3C.

Meanwhile, a column "Display Vsync" includes the pictures read out from the frame buffer 2-3 synchronously with the signal Vsync shown in FIG. 3D and displayed on the display device 3.

Now each of FIGS. 6 through 31 will be schematically described below.

FIG. 6 shows an example in performing reverse reproduction with I- and P-pictures, wherein the number of storable frames (number of areas) in the frame buffer 2-3 is set to three.

FIG. 7 shows another example in performing reverse reproduction with I- and P-pictures, wherein the number of storable frames (number of areas) in the frame buffer 2-3 is set to three.

FIG. 8 shows an example in performing reverse reproduction with I-, P- and B-pictures, wherein the number of storable frames (number of areas) in the frame buffer 2-3 is set to three.

FIG. 9 shows another example in performing reverse reproduction with I- and P-pictures, wherein the number of storable frames (number of areas) in the frame buffer 2-3 is set to three.

FIG. 10 shows an example in performing reverse reproduction with entire I- and P-pictures, wherein the number of storable frames (number of areas) in the frame buffer 2-3 is set to three.

FIG. 11 shows another example in performing reverse reproduction with entire I- and P-pictures, wherein the number of storable frames (number of areas) in the frame buffer 2-3 is set to four.

FIG. 12 shows an example in performing reverse reproduction with approximately alternate I- and P-pictures, wherein the number of storable frames (number of areas) in the frame buffer 2-3 is set to three.

FIG. 13 shows another example in performing reverse reproduction with I- and P-pictures, wherein the number of storable frames (number of areas) in the frame buffer 2-3 is set to three.

FIG. 14 shows an example in performing reverse reproduction with I- and P-pictures while not displaying any same pictures in succession, wherein the number of storable frames (number of areas) in the frame buffer 2-3 is set to five.

FIG. 15 shows another example in performing reverse reproduction with I- and P-pictures, wherein the number of storable frames (number of areas) in the frame buffer 2-3 is set to three.

FIG. 16 shows another example in performing reverse reproduction with I- and P-pictures, wherein the number of storable frames (number of areas) in the frame buffer 2-3 is set to three.

FIG. 17 shows another example in performing reverse reproduction with I- and P-pictures, wherein the number of storable frames (number of areas) in the frame buffer 2-3 is set to three.

FIG. 18 shows another example in performing reverse reproduction with I- and P-pictures, wherein the number of storable frames (number of areas) in the frame buffer 2-3 is set to two.

FIG. 19 shows a further example in performing reverse reproduction with I- and P-pictures, wherein the number of storable frames (number of areas) in the frame buffer 2-3 is set to two.

FIG. 20 shows an example in performing reverse reproduction with entire I- and P-pictures and alternate B-pictures, wherein the number of storable frames (number of areas) in the frame buffer 2-3 is set to three.

FIG. 21 shows an example in performing reverse reproduction with entire I- and P-pictures and some B-pictures while not displaying any same pictures in succession, wherein the number of storable frames (number of areas) in the frame buffer 2-3 is set to six.

FIG. 22 shows an example in performing partial reverse reproduction with successive I-, P- and B-pictures, wherein the number of storable frames (number of areas) in the frame buffer 2-3 is set to three.

FIGS. 23 to 25 show an example in performing reverse reproduction with entire I-, P- and B-pictures, wherein the number of storable frames (number of areas) in the frame buffer 2-3 is set to four.

FIGS. 26 to 28 show an example in performing reverse reproduction with approximately entire I-, P- and B-pictures, wherein the number of storable frames (number of areas) in the frame buffer 2-3 is set to three.

And FIGS. 29 to 31 show another example in performing reverse reproduction with approximately entire I-, P- and B-pictures, wherein the number of storable frames (number of areas) in the frame buffer 2-3 is set to three.

Although the explanation given above is concerned with an exemplary case of coded data read out from recording media, the present invention is not limited thereto alone, and the coded data may be those stored via communication media or broadcasting media as well.

Thus, according to the present invention, some portions of I-picture and P-picture data constituting unit data are continuously decoded in a special reproduction mode, while the remaining picture data are intermittently decoded and transferred to a display means, thereby reducing the number of required decoding steps.

Consequently it becomes unnecessary to raise the data transfer rate to the decoder, hence eliminating failure in the data flow.

Furthermore, the reproduced pictures can be displayed with reduction of the display delay time without the necessity of increasing the storage capacity of the frame buffer required for special reproduction.

Although the present invention has been described hereinabove with reference to some preferred embodiments thereof, it is to be understood that the invention is not limited to such embodiments alone, and a variety of other modifications and variations will be apparent to those skilled in the art without departing from the spirit of the invention.

The scope of the invention, therefore, is to be determined solely by the appended claims.

What is claimed is:

1. A method of reproducing coded data from a recording medium, wherein said coded data is comprised of a predetermined unit group of frames composed of intra-frame coded (I-picture) data, forward predictive coded (P-picture) data and bidirectionally predictive coded (B-picture) data, said method comprising the steps of:

selecting, for decoding in a reverse reproduction mode, a portion of said coded data from said unit group, including only a selected portion of said B-picture data of said unit group;

successively decoding from said selected portion of coded data, when in said reverse reproduction mode, I-picture and consecutive P-picture data, intermittently decoding remaining P-picture data, and intermittently decoding the selected B-picture data of said unit group; and outputting the decoded data in said reverse reproduction mode in a reverse order of an original picture sequence absent non-selected B-picture data of said unit group.

2. The method according to claim 1, wherein said portion of coded data selected in said selecting step comprises all said I-picture and P-picture data of said unit group.

3. The method according to claim 1, wherein said step of selecting includes reading said consecutive I-picture and P-picture coded data from said recording medium to provide read coded data; and storing the read coded data.

4. The method according to claim 3, wherein said step of outputting includes storing a plurality of frames of the decoded data; and reading the stored data in the reverse order.

5. Apparatus for reproducing coded data from a recording medium, wherein said coded data is comprised of a predetermined unit group of frames composed of intra-frame coded (I-picture) data, forward predictive coded (P-picture) data and bidirectionally predictive coded (B-picture) data, said apparatus comprising:

a selector for selecting, in a reverse reproduction mode, a portion of said coded data from said unit group for decoding, including only a selected portion of said B-picture data of said unit group;

a decoder for successively decoding, from said selected portion of coded data in said reverse reproduction mode, I-picture data and consecutive P-picture data, for intermittently decoding remaining P-picture data of the unit group, and for intermittently decoding the selected B-picture data; and an output device for outputting the decoded data in said reverse reproduction mode in a reverse order of an original picture sequence absent non-selected B-picture data of said unit group.

6. The apparatus according to claim 5, wherein said portion of coded data selected by said selector comprises all said I-picture and P-picture data of said unit group.

7. The apparatus according to claim 6, wherein said selector includes a reproducer for reading said consecutive I-picture and P-picture coded data; and a first storage device for storing the read coded data.

8. The apparatus according to claim 7, wherein said output device comprises: a second storage device for storing a plurality of frames of the decoded data; and a reading device for reading the stored data in the reverse order.

9. The apparatus according to claim 8, wherein said second storage device consists of at least three frame memories.

10. The apparatus according to claim 9, wherein said recording medium is an optical disk.

11. The apparatus according to claim 9, wherein said unit group is composed of fifteen frames.

12. The apparatus according to claim 5, wherein said selector selects the entire intra-frame coded data and forward predictive coded data intermittently.

13. The apparatus according to claim 8, wherein said reading device reads out the same data a plurality of times repeatedly.

* * * * *